United States Patent
Yu et al.

(10) Patent No.: US 11,142,268 B2
(45) Date of Patent: Oct. 12, 2021

(54) LIGHTWEIGHT 4-DEGREE-OF-FREEDOM LEG MECHANISM OF BIONIC QUADRUPED ROBOT

(71) Applicant: YANSHAN UNIVERSITY, Hebei (CN)

(72) Inventors: Bin Yu, Hebei (CN); Kaixian Ba, Hebei (CN); Jiankui Yang, Hebei (CN); Qixin Zhu, Hebei (CN); Zhipeng Huang, Hebei (CN); Lipeng Yuan, Hebei (CN)

(73) Assignee: YANSHAN UNIVERSITY, Qinghuangdao (CN)

( * ) Notice: Subject to any disclaimer, the term of this patent is extended or adjusted under 35 U.S.C. 154(b) by 0 days.

(21) Appl. No.: 17/221,474

(22) Filed: Apr. 2, 2021

(65) Prior Publication Data

US 2021/0229765 A1    Jul. 29, 2021

(30) Foreign Application Priority Data

May 19, 2020   (CN) .......................... 202010422963.6

(51) Int. Cl.
*B62D 57/032*     (2006.01)
*B25J 17/02*      (2006.01)

(52) U.S. Cl.
CPC ........ *B62D 57/032* (2013.01); *B25J 17/0258* (2013.01)

(58) Field of Classification Search
CPC ...... B62D 57/032; B25J 17/0258; B25J 17/00
See application file for complete search history.

(56) References Cited

U.S. PATENT DOCUMENTS

| | | | | |
|---|---|---|---|---|
| 4,776,230 A | * | 10/1988 | Susnjara | B25J 17/0258 414/917 |
| 9,499,219 B1 | * | 11/2016 | Jackowski | B62D 57/032 |
| 9,662,787 B1 | * | 5/2017 | Jackowski | B62D 57/032 |
| 9,895,804 B1 | * | 2/2018 | Perkins | B25J 9/1664 |
| 2013/0152724 A1 | * | 6/2013 | Mozeika | B25J 9/0015 74/490.05 |
| 2015/0101871 A1 | * | 4/2015 | Riskas | E02F 9/2271 180/8.6 |
| 2018/0358870 A1 | * | 12/2018 | Kawanami | A61B 90/25 |
| 2019/0091857 A1 | * | 3/2019 | Ben-Tzvi | B25J 9/1664 |

(Continued)

FOREIGN PATENT DOCUMENTS

CN    103318289 A    9/2013
CN    205706943 U    11/2016

(Continued)

*Primary Examiner* — Zakaria Elahmadi

(57) ABSTRACT

A lightweight 4-degree-of-freedom leg mechanism of a bionic quadruped robot, which includes a hip-joint lateral-swing assembly, a thigh longitudinal-swing assembly and a shank longitudinal-swing assembly. The hip-joint lateral-swing assembly includes a hip-joint swing cylinder and an electro-hydraulic actuator. One end of the electro-hydraulic actuator and one end of the thigh longitudinal-swing assembly are respectively connected to the hip-joint swing cylinder via a connecting block. The other end of the electro-hydraulic actuator is hinged to a side of the thigh longitudinal-swing assembly. The other end of the thigh longitudinal-swing assembly is hinged to the shank longitudinal-swing assembly.

9 Claims, 5 Drawing Sheets

(56) References Cited

U.S. PATENT DOCUMENTS

| | | | | |
|---|---|---|---|---|
| 2019/0240832 A1* | 8/2019 | Kawaguchi | ............ | F16H 21/46 |
| 2020/0290217 A1* | 9/2020 | Chernyak | ............ | B25J 9/0015 |
| 2020/0361101 A1* | 11/2020 | Zhang | ................ | B25J 19/0025 |
| 2021/0162602 A1* | 6/2021 | Kawaguchi | ................ | B25J 5/00 |
| 2021/0187758 A1* | 6/2021 | Lee | ......................... | B25J 19/02 |

FOREIGN PATENT DOCUMENTS

| | | |
|---|---|---|
| CN | 207345974 U | 5/2018 |
| CN | 109501881 A | 3/2019 |
| CN | 109760762 A | 5/2019 |
| CN | 110562346 A | 12/2019 |
| KR | 20120102190 A | 9/2012 |

\* cited by examiner

LIGHTWEIGHT 4-DEGREE-OF-FREEDOM LEG MECHANISM OF BIONIC QUADRUPED ROBOT

CROSS-REFERENCE TO RELATED APPLICATIONS

This application claims the benefit of priority from Chinese Patent Application No. 202010422963.6, filed on May 19, 2020. The content of the aforementioned application, including any intervening amendments thereto, is incorporated herein by reference in its entirety.

TECHNICAL FIELD

This application relates to components of bionic robots, and more particularly to a lightweight 4-degree-of-freedom leg mechanism of a bionic quadruped robot.

BACKGROUND

With the rapid development of science and technology in the 21st century, high-end mobile equipment, such as construction machinery, metallurgical machinery, aircraft, auxiliary exoskeleton and quadruped bionic robots has been extensively researched and applied. The high-end mobile equipment mainly moves by means of wheels and feet. By comparison, the foot-based motion has better adaptability to the unstructured environments and high leg flexibility, and thus is widely appreciated. In terms of the number of legs, the legged bionic robots can be divided into bipedal, quadruped, hexapod and polypod robots, among which the quadruped robot is the most practical, and is widely used in the disaster relief, daily transportation and entertainment. The leg structure of the quadruped bionic robot is usually driven by electric power, pneumatic power and hydraulic power. The hydraulic drive has high power-to-weight ratio, good stability, small reversing impact, fast response and large thrust. Therefore, the study of integrated leg mechanism of the hydraulically-powered quadruped bionic robot is of great importance.

Currently, the hydraulic drive of the leg mechanism of the quadruped robot is mainly realized by means of an external pipeline, and the arrangement of the leg mechanism is relatively scattered. Such leg mechanism has large joint weight, small motion range and insufficient driving ability, and thus the motion accuracy and response speed are limited. In addition, the connection pipeline between the servo valve and the servo cylinder is too long, which reduces the natural frequency of the system, hindering the dynamic response and increasing the hydraulic power loss. Therefore, the walking ability and engineering application of the hydraulic-drive quadruped robot are limited.

In view of the above shortcomings, a Chinese patent publication No. 106627831A discloses a single-leg mechanism of a quadruped robot. A lower end of a shank portion is equipped with a three-dimensional sensor. The leg mechanism of the quadruped robot has three active degrees of freedom driven by a belt. Three motors and two belts are provided to realize a relative rotation of three joints of the leg mechanism, so as to achieve a motion of the leg mechanism. The Chinese patent publication No. 110155204A discloses a leg mechanism of a quadruped robot, which includes a front frame, a rear frame, a side swing assembly, a thigh assembly and a shank assembly. A rod mechanism is used as the leg of the quadruped robot, and has three degrees of freedom, which are two degrees of rotation freedom in a forward direction and one degree of freedom in a side swing direction. The Chinese patent publication No. 110304170A discloses a quadruped robot and a leg mechanism thereof. The leg mechanism has a simple structure, which includes a side swing assembly, a hip-joint assembly, a thigh assembly and a shank assembly, realizing a front-and-rear swing and a left-and-right swing of the leg mechanism and improving its flexibility, which provides a better user experience.

In conclusion, the hydraulic-drive quadruped robot has a promising application prospect, however, the existing leg mechanism thereof has low structure integration, poor flexibility and response speed, large joint weight, insufficient driving ability and large hydraulic power loss, which cannot meet the high-performance requirements of the hydraulic quadruped bionic robot as high-end mobile equipment.

SUMMARY

To solve the problems in the prior art, the present disclosure provides a 4-degree-of-freedom leg mechanism of a bionic quadruped robot, which has high integration and light weight, and does not require an external hydraulic pipeline, allowing for improved flexibility.

Technical solutions to achieve the above objects are described as follows.

This application provides a 4-degree-of-freedom leg mechanism of a bionic quadruped robot, comprising:

a hip-joint lateral-swing assembly;

a thigh longitudinal-swing assembly; and a shank longitudinal-swing assembly;

wherein the hip-joint lateral-swing assembly comprises a hip-joint swing cylinder and an electro-hydraulic actuator; one end of the electro-hydraulic actuator and one end of the thigh longitudinal-swing assembly are respectively connected to the hip-joint swing cylinder via a connecting block; the other end of the electro-hydraulic actuator is hinged to a side of the thigh longitudinal-swing assembly; and the other end of the thigh longitudinal-swing assembly is hinged to the shank longitudinal-swing assembly.

In some embodiments, an oil line in the electro-hydraulic actuator and an oil line in the thigh longitudinal-swing assembly are respectively communicated with an oil line in a lateral-swing shaft of the hip-joint swing cylinder through a passage in the connecting block.

In some embodiments, an upper end of the connecting block is fixedly connected to a flange of the lateral-swing shaft via a bolt; a lower end of the connecting block is of a U-shaped structure; the lower end of the connecting block is provided with an oil inlet and an oil outlet; an oil distribution shaft is rotatably arranged at both ends of the lower end of the connecting block, respectively; an oil line communicating with the oil inlet and at least one oil hole communicating with the oil outlet are respectively arranged in the oil distribution shaft; both sides of each of the at least one oil hole are respectively provided with a rigid seal; and the rigid seal are sealedly connected to the electro-hydraulic actuator and the thigh longitudinal-swing assembly, respectively.

In some embodiments, the electro-hydraulic actuator comprises a cylinder body, a cylinder rod and a guide rod; the cylinder rod and the guide rod are respectively arranged in the cylinder body; a top end of the cylinder rod and a top end of the guide rod are connected through a connecting plate; the top end of the cylinder rod is connected to a lug ring; an end of the cylinder body is provided with an axle steel housing; the lug ring is hinged to a side wall of the thigh longitudinal-swing assembly; and the axle steel housing is fixedly connected to the oil distribution shaft.

In some embodiments, a displacement sensor is provided on the connecting plate; a force sensor is arranged between the lug ring and the connecting plate; and a servo valve is communicated with the cylinder body.

In some embodiments, the thigh longitudinal-swing assembly comprises a protective cover, a hydraulic cylinder and a servo valve; and the hydraulic cylinder and the servo valve are sleeved in the protective cover; a cylinder body of the hydraulic cylinder is communicated with the servo valve; the servo valve communicates with the oil line in the lateral-swing shaft; and a cylinder rod of the hydraulic cylinder is hinged to the shank longitudinal-swing assembly through a sliding-block linkage.

In some embodiments, the sliding-block linkage comprises a sleeve, a sliding block and a pushing rod; the sleeve is connected to the cylinder body of the hydraulic cylinder; the cylinder rod of the hydraulic cylinder is connected to one end of the sliding block; the sliding block is sleeved into the sleeve; the other end of the sliding block is hinged to one end of the pushing rod; and the other end of the pushing rod and the sleeve are hinged with the shank longitudinal-swing assembly, respectively.

In some embodiments, the shank longitudinal-swing assembly comprises an outer cylinder, an inner rod, a damping spring and a foot end; the inner rod is inserted into the outer cylinder; an upper end of the inner rod is provided with a limit ring; a lower end of the inner rod is fixedly connected to the foot end; the damping spring is arranged between the foot end and the outer cylinder; and the damping spring is sleeved on the inner rod.

In some embodiments, the foot end comprises an ankle, a fixed part and a positioning foot; the ankle is connected to the inner rod and the fixed part, respectively; the fixed part is provided with a groove for accommodating the positioning foot; and the positioning foot is fixedly connected to the fixed part via a bolt.

In some embodiments, a six-dimensional force sensor is arranged between the ankle and the inner rod; the positioning foot is a rubber cylinder; and a groove is arranged on a cylindrical surface of the positioning foot contacting with a ground.

The beneficial effects of the present disclosure are described as follows.

This disclosure provides a four-degree-of-freedom leg mechanism of a quadruped bionic robot, which realizes light-weighting of the leg mechanism by means of an integrated oil line. A hip-joint swing cylinder driven by a hydraulic pump has strong load-resistance and high power-to-weight ratio. An electro-hydraulic actuator and a thigh longitudinal-swing assembly have fast response and accurately measurable dynamic parameters, and realize four degrees of freedom that include three active degrees of freedom and one passive degree of freedom.

BRIEF DESCRIPTION OF THE DRAWINGS

The technical solutions of this disclosure or the prior art will be described in detail below with reference to the accompanying drawings and embodiments. Obviously, presented in the accompanying drawings are merely some embodiments of this disclosure, and other embodiments made by those skilled the art without departing from the spirit of the disclosure should fall within the scope of the disclosure.

Figure 1:
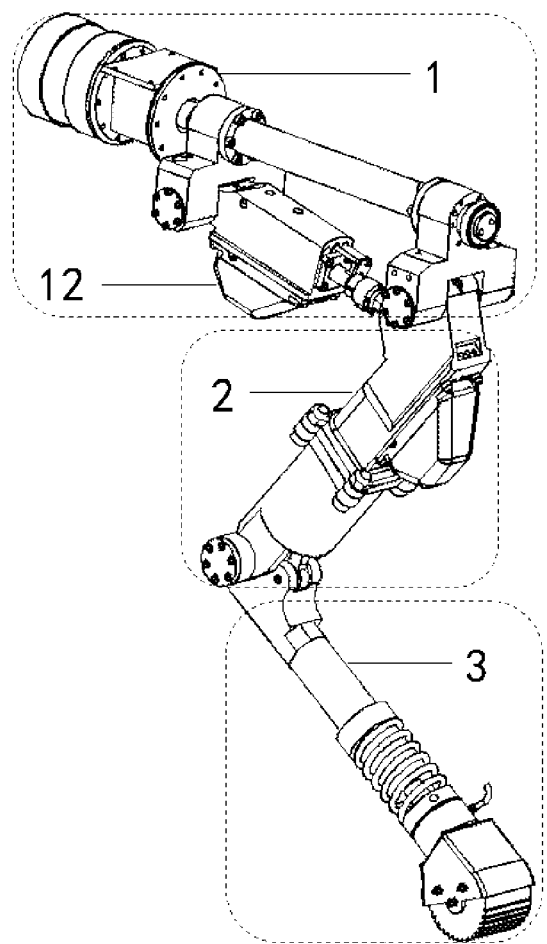
FIG. 1 schematically depicts a structure of a lightweight 4-degree-of-freedom leg mechanism of a bionic quadruped robot in accordance with an embodiment of the present disclosure.
Figure 2:
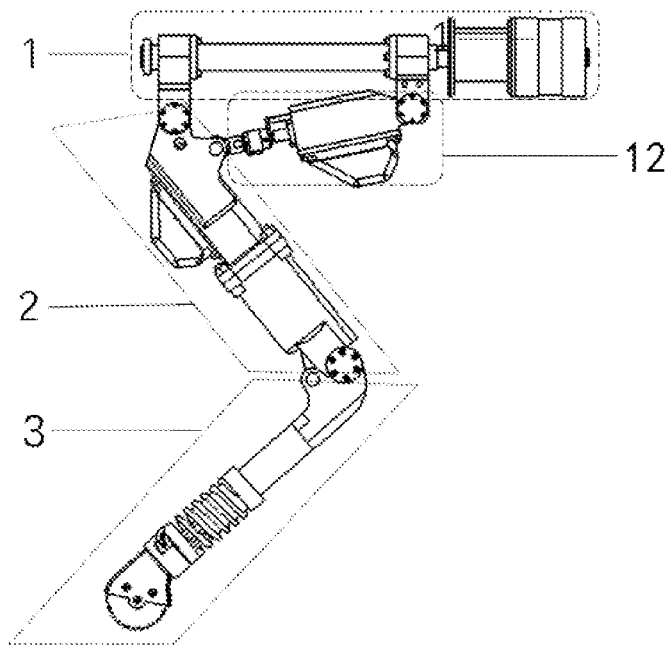
FIG. 2 schematically depicts a structure of the lightweight 4-degree-of-freedom leg mechanism of a bionic quadruped robot in accordance with an embodiment of the present disclosure.
Figure 3:
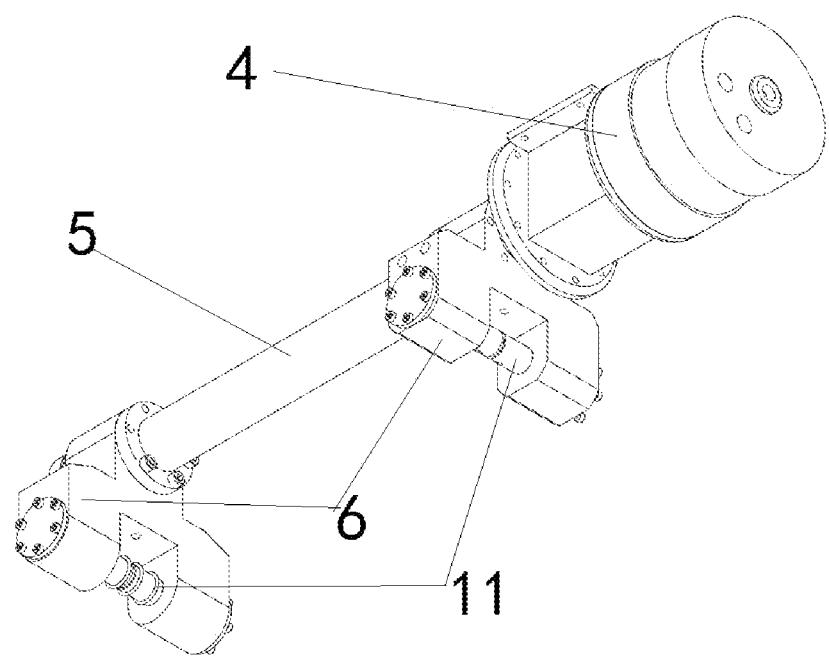
FIG. 3 schematically depicts a structure of a hip-joint lateral-swing assembly in accordance with an embodiment of the present disclosure.
Figure 4:
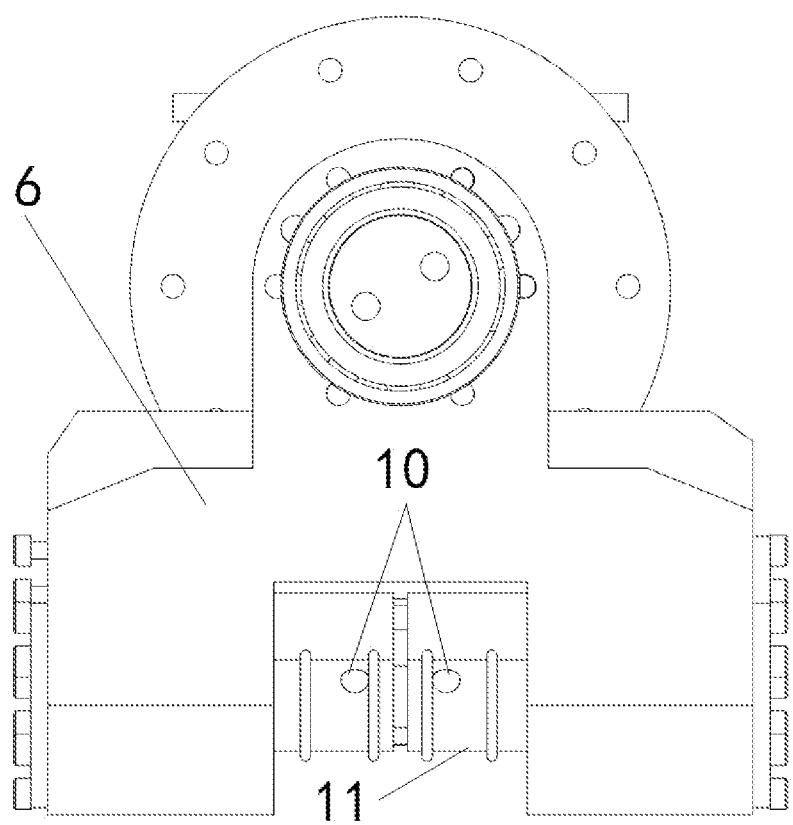
FIG. 4 schematically depicts a structure of a connecting block in accordance with an embodiment of the present disclosure.
Figure 5:
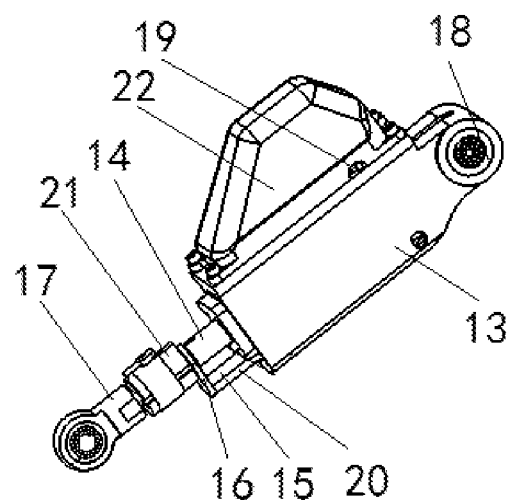
FIG. 5 schematically depicts a structure of an electro-hydraulic actuator in accordance with an embodiment of the present disclosure.
Figure 6:
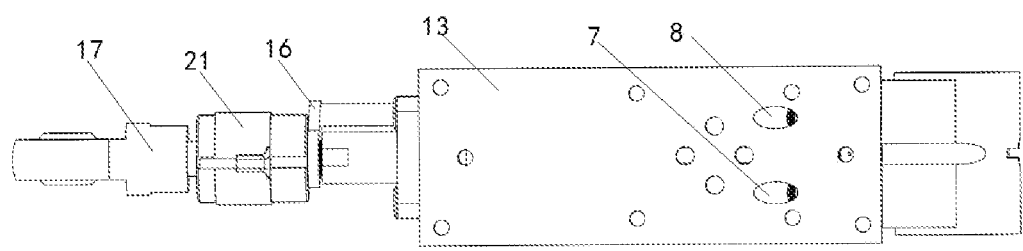
FIG. 6 schematically depicts a structure of the electro-hydraulic actuator in accordance with an embodiment of the present disclosure.
Figure 7:
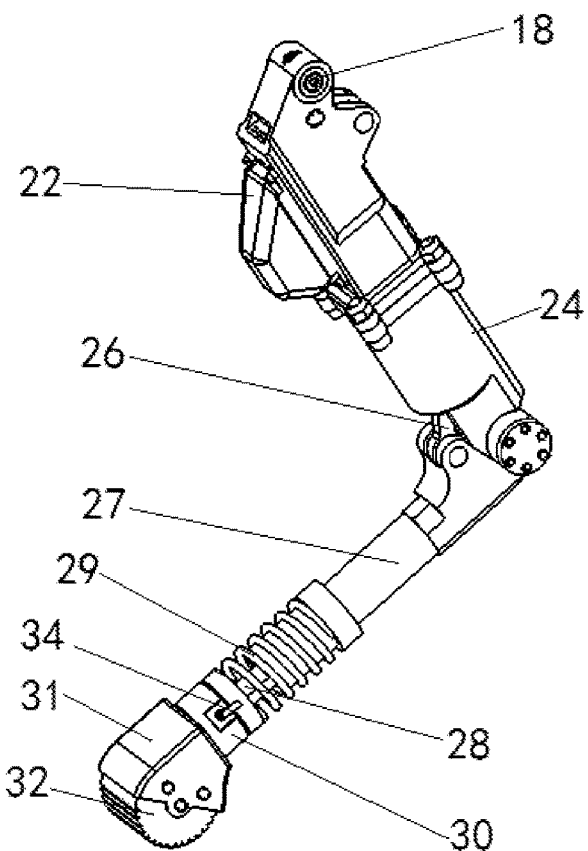
FIG. 7 schematically depicts structures of a thigh longitudinal-swing assembly and a shank longitudinal-swing assembly in accordance with an embodiment of the present disclosure.

In the drawings: 1, hip-joint lateral-swing assembly; 2, thigh longitudinal-swing assembly; 3, shank longitudinal-swing assembly; 4, hip-joint swing cylinder; 5, lateral-swing shaft; 6, connecting block; 7, oil inlet; 8, oil outlet; 9, oil line; 10, oil hole; 11, oil distribution shaft; 12, electro-hydraulic actuator; 13, cylinder body; 14, cylinder rod; 15, guide rod; 16, connecting plate; 17, lug ring; 18, axle steel housing; 19, servo valve; 20, displacement sensor; 21, force sensor; 22, protective cover; 23, hydraulic cylinder; 24, sleeve; 25, sliding block; 26, pushing rod; 27, outer cylinder; 28, inner rod; 29, damping spring; 30, ankle; 31, fixed part; 32, positioning foot; 33, limit ring; and 34, six-dimensional force sensor.

DETAILED DESCRIPTION OF EMBODIMENTS

The disclosure will be described in detail below with reference to the accompanying drawings and embodiments to make technical solutions of the disclosure clearer. Obviously, presented in the accompanying drawings are merely some embodiments of this disclosure, and other embodiments made by those skilled the art without departing from the spirit of the disclosure should fall within the scope of the disclosure.

To solve the problems in the prior art, the present disclosure provides a lightweight 4-degree-of-freedom leg mechanism of a bionic quadruped robot, so that the leg mechanism is lightweight by means of high integration, and does not require an external hydraulic pipeline, improving the flexibility of the leg mechanism.

The objects, technical solutions and beneficial effects will be further described below with reference to the accompanying drawings and embodiments.

As shown in FIGS. 1-9, a lightweight 4-degree-of-freedom leg mechanism of a bionic quadruped robot includes a hip-joint lateral-swing assembly 1, a thigh longitudinal-swing assembly 2 and a shank longitudinal-swing assembly 3. The hip-joint lateral-swing assembly 1 includes a hip-joint swing cylinder 4 and an electro-hydraulic actuator 12. One end of the electro-hydraulic actuator 12 and one end of the thigh longitudinal-swing assembly 2 are respectively connected to the hip-joint swing cylinder 4 via a connecting block 6. The other end of the electro-hydraulic actuator 12 is hinged to a side of the thigh longitudinal-swing assembly 2. The other end of the thigh longitudinal-swing assembly 2 is hinged to the shank longitudinal-swing assembly 3.

Specifically, an oil line 9 in the electro-hydraulic actuator 12 and an oil line 9 in the thigh longitudinal-swing assembly 2 are respectively communicated with an oil line 9 in a lateral-swing shaft 5 of the hip-joint swing cylinder 4 through a passage in the connecting block 6. An upper end of the connecting block 6 is fixedly connected to a flange of the lateral-swing shaft 5 via a bolt. A lower end of the connecting block 6 is of a U-shaped structure, and is provided with an oil inlet 7 and an oil outlet 8. An oil distribution shaft 11 is rotatably arranged at both ends of the lower end of the connecting block 6, respectively. An oil line 9 communicating with the oil inlet 7 and at least one oil hole 10 communicating with the oil outlet 8 are arranged in the oil distribution shaft 11. Both sides of each of the at least one oil hole 10 are respectively provided with a rigid seal. The rigid seal is sealedly connected to the electro-hydraulic actuator 12 and the thigh longitudinal-swing assembly 2, respectively. The hip-joint swing cylinder 4 is driven by a hydraulic pump, which is energy-saving and has strong anti-load capability. Compared with a transverse motion of a robot body, a transmission structure of the hip-joint swing cylinder 4 is simple and practical, and realizes an integration of the leg mechanism. Moreover, the transmission structure can also buffer the side collision force of the integrated leg mechanism. A design of a highly-integrated mechanical structure without an external hydraulic pipeline enables a four-degree-of-freedom movement with three active degrees of freedom and one passive degree of freedom.

The electro-hydraulic actuator 12 is a valve-controlled cylinder, including a cylinder body 13, a cylinder rod 14 and a guide rod 15. The cylinder rod 14 and the guide rod 15 are respectively arranged in the cylinder body 13, and a top end of the cylinder rod 14 and a top end of the guide rod 15 are connected through a connecting plate 16. The top of the cylinder rod 14 is connected to a lug ring 17. An end of the cylinder body 13 is provided with an axle steel housing 18. The lug ring 17 is hinged to a side wall of the thigh longitudinal-swing assembly 2. The axle steel housing 18 is fixedly connected to the oil distribution shaft 11. The lug ring 17 and the axle steel housing 18 are respectively provided with a bearing therein. A displacement sensor 20 is provided on the connecting plate 16. A force sensor 21 is arranged between the lug ring 17 and the connecting plate 16. A servo valve 19 is communicated with the cylinder body 13. The displacement sensor 20, the force sensor 21 and the servo valve 19 are all electrically connected to a controller of the robot, so that dynamic parameters (such as rotation speed of joints of a foot end, output state of the cylinder rod 14) of the leg mechanism can be easily and accurately measured. A protective cover 22 is provided outside the cylinder body 13 and the servo valve 19. The valve-controlled cylinder has a compact structure design, fast action response and high power-to-weight ratio. A flow channel of hydraulic oil is arranged in a transmission shaft and the cylinder block 13, which can reduce the weight and moment of inertia of the leg mechanism. The two hinge positions at the upper end of the thigh longitudinal-swing assembly 2 are adjacent to each other, which can increase the motion range and output torque of the joint.

The thigh longitudinal-swing assembly 2 includes the protective cover 22, a hydraulic cylinder 23 and the servo valve 19. The hydraulic cylinder 23 and the servo valve 19 are sleeved in the protective cover 22. An end of a cylinder body 13 of the hydraulic cylinder 23 is provided with the axle steel housing 18 configured for hinged connection. The cylinder body 13 of the hydraulic cylinder 23 is communicated with the servo valve 19. The servo valve 19 communicates with the oil line in the lateral-swing shaft 5. A cylinder rod 14 of the hydraulic cylinder 23 is hinged to the shank longitudinal-swing assembly 3 through a sliding-block linkage. The sliding-block linkage includes a sleeve 24, a sliding block 25 and a pushing rod 26. The sleeve 24 is connected to the cylinder body 13 of the hydraulic cylinder 23. The cylinder rod 14 of the hydraulic cylinder 23 is connected to one end of the sliding block 25. The sliding block 25 is sleeved into the sleeve 24. The other end of the sliding block 25 is hinged to one end of the pushing rod 26. The other end of the pushing rod and the sleeve 24 are hinged with the shank longitudinal-swing assembly 3, respectively. The cylinder rod 14 of the hydraulic cylinder 23 pushes the sliding block 25 to slide such that the sliding block 25 drives the pushing rod 26 to move, to change a swing angle of the shank longitudinal-swing assembly 3 with the ground. The electro-hydraulic actuator 12 and the thigh longitudinal-swing assembly 2 are both driven by valve-controlled cylinder drive, which achieves high-density integration of multiple devices with small size and light weight. There is no external pipeline arranged between the servo valve 19 and the hydraulic cylinder 23, reducing damage and leakage failure of pipeline joint of the integrated leg mechanism, and improving the dynamic response speed of the movement.

The shank longitudinal-swing assembly 3 includes an outer cylinder 27, an inner rod 28, a damping spring 29 and the foot end. The inner rod 28 is inserted into the outer cylinder 27, and an upper end of the inner rod 28 is provided with a limit ring 33 to ensure a linearity of an axial movement of the inner rod 28. A lower end of the inner rod 28 is fixedly connected to the foot end. The damping spring 29 is arranged between the foot end and the outer cylinder 27. The damping spring 29 is sleeved on the inner rod 28. The foot end includes an ankle 30, a fixed part 31 and a positioning foot 32. The ankle 30 is respectively connected to the inner rod 28 and the fixed part 31. The fixed part 31 is provided with a groove configured to accommodate the positioning foot 32. The positioning foot 32 is fixedly connected to the fixed part 31 via a bolt. The ankle 30 is a cylindrical connecting member. A six-dimensional force sensor 34 is arranged between the ankle 30 and the inner rod 28. The positioning foot 32 is a rubber cylinder, and a groove is arranged on a cylindrical surface of positioning foot 32 contacting with the ground to increase a friction force, so as to ensure stability of the leg mechanism when contacting the ground at different angles. A passive degree of freedom can provide a good buffer, and thus protect a structure of the leg mechanism. The outer cylinder 27 is of a hollow structure, which reduces the weight of the mechanism, and allows a wire arrangement of the six-dimensional force sensor 34.

Three active degrees of freedom of the leg mechanism are a hip-joint transverse degree of freedom and a hip-joint longitudinal degree of freedom provided by a hydraulic swing cylinder, and a knee-joint longitudinal degree of freedom. One passive degree of freedom is provided by the damping spring 29 and the rubber-cylinder positioning foot 32.

Figure 8:
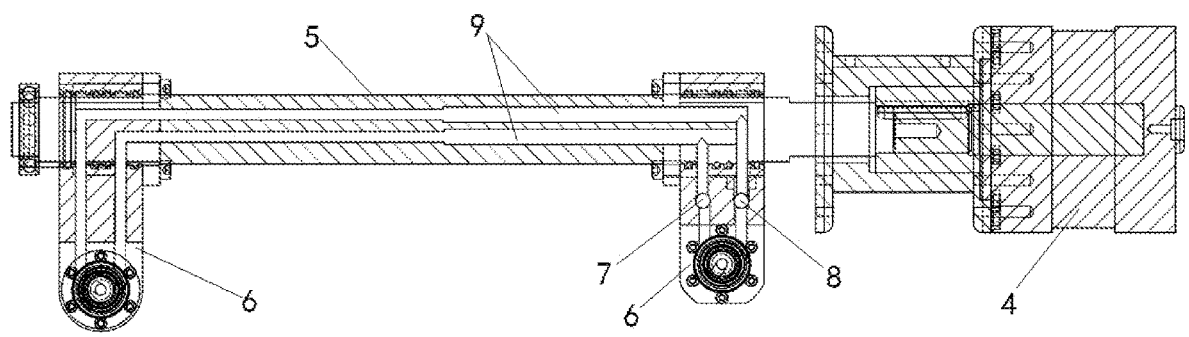
FIG. 8 schematically depicts a structure of an oil line in the hip-joint lateral-swing assembly.
Figure 9:
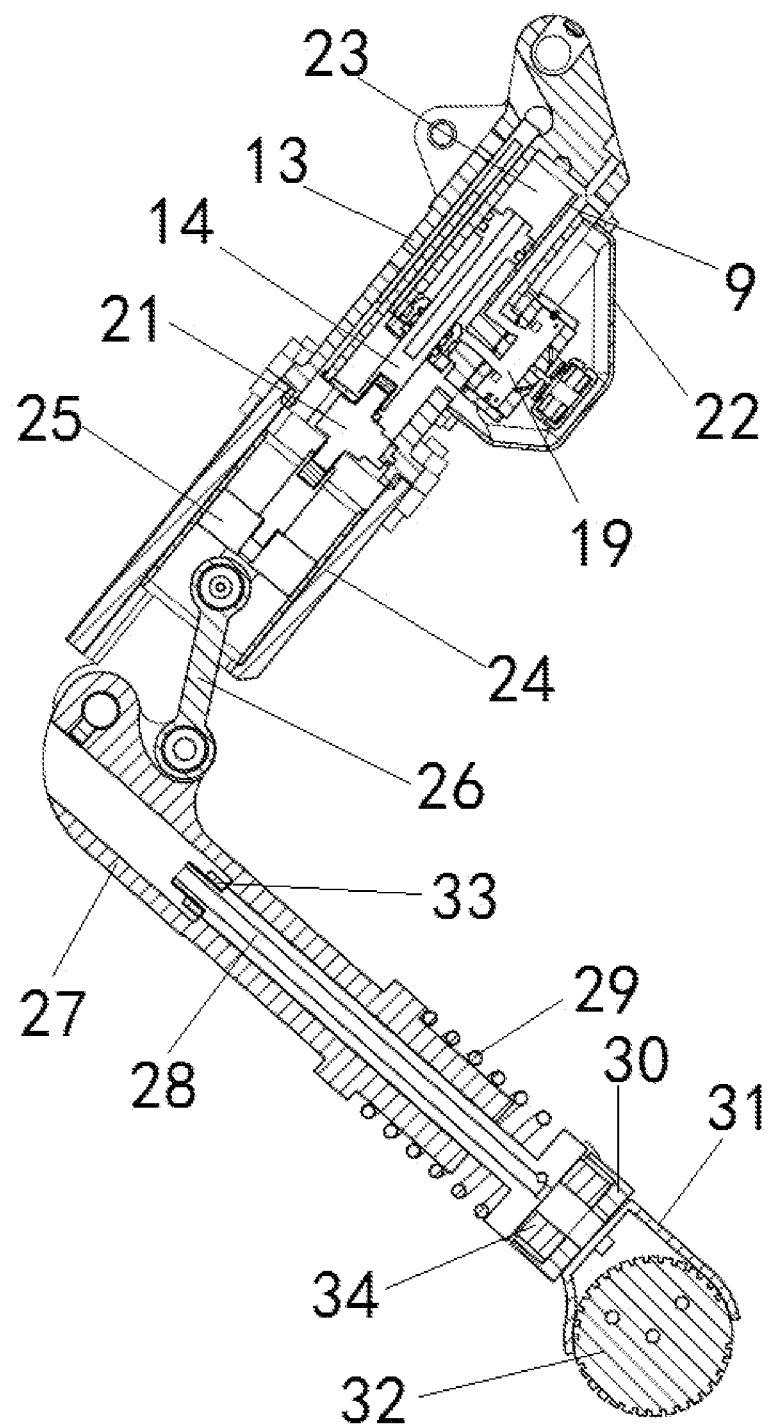
FIG. 9 schematically depicts a structure of the oil line in the thigh longitudinal-swing assembly.

The arrangement of the oil line 9 is shown in FIGS. 8-9. One end of the two oil lines 9 in the lateral-swing shaft 5 is communicated with the oil inlet 7 and the oil outlet 8 of the connecting block 6, respectively. Meanwhile, the oil inlet 7 and the oil outlet 8 are communicated with the oil line 9 in the cylinder body 13 of the electro-hydraulic actuator 12 through the connecting block 6, the oil distribution shaft 11 and the servo valve 19 to form a first oil circulation line. The other end of the two oil lines 9 in the lateral-swing shaft 5 is are communicated with the oil line 9 in the cylinder body 13 of the thigh longitudinal-swing assembly 2 through the connecting block 6, the oil distribution shaft 11 and the servo valve 19 to form a second oil circulation line.

The embodiments provided herein are illustrative of this disclosure, and not intended to limit the disclosure. Variations and modification made by those skilled in the art without departing from the spirit of this disclosure should fall within the scope of the disclosure defined by the appended claims.

What is claimed is:

1. A 4-degree-of-freedom leg mechanism of a bionic quadruped robot, comprising:
   a hip-joint lateral-swing assembly;
   a thigh longitudinal-swing assembly; and
   a shank longitudinal-swing assembly;
   wherein the hip joint lateral-swing assembly comprises a hip-joint swing cylinder and an electro-hydraulic actuator; one end of the electro-hydraulic actuator and one end of the thigh longitudinal-swing assembly are respectively connected to the hip joint swing cylinder via a connecting block; the other end of the electro-hydraulic actuator is hinged to a side of the thigh longitudinal-swing assembly; the other end of the thigh longitudinal-swing assembly is hinged to the shank longitudinal-swing assembly; and an oil line in the electro-hydraulic actuator and an oil line in the thigh longitudinal-swing assembly are respectively communicated with an oil line in a lateral-swing shaft of the hip joint swing cylinder through a passage in the connecting block;
      a lower end of the connecting block is provided with an oil inlet and an oil outlet; an oil distribution shaft is rotatably arranged at both ends of the lower end of the connecting block, respectively; an oil line communicating with the oil inlet and at least one oil hole communicating with the oil outlet are respectively arranged in the oil distribution shaft.

2. The 4-degree-of-freedom leg mechanism of claim 1, wherein an upper end of the connecting block is fixedly connected to a flange of the lateral-swing shaft via a bolt; the lower end of the connecting block is of a U-shaped structure; both sides of each of the at least one oil hole are respectively provided with a rigid seal; and the rigid seal is sealedly connected to the electro-hydraulic actuator and the thigh longitudinal-swing assembly, respectively.

3. The 4-degree-of-freedom leg mechanism of claim 2, wherein the electro-hydraulic actuator comprises a cylinder body, a cylinder rod and a guide rod; the cylinder rod and the guide rod are arranged in the cylinder body; a top end of the cylinder rod and a top end of the guide rod are connected through a connecting plate; the top end of the cylinder rod is connected to an lug ring; an end of the cylinder body is provided with an axle steel housing; the lug ring is hinged to a side wall of the thigh longitudinal-swing assembly; and the axle steel housing is fixedly connected to the oil distribution shaft.

4. The 4-degree-of-freedom leg mechanism of claim 3, wherein a displacement sensor is provided on the connecting plate; a force sensor is arranged between the lug ring and the connecting plate; and a servo valve is communicated with the cylinder body.

5. The 4-degree-of-freedom leg mechanism of claim 1, wherein the thigh longitudinal-swing assembly comprises a protective cover, a hydraulic cylinder and a servo valve; and the hydraulic cylinder and the servo valve are sleeved in the protective cover; a cylinder body of the hydraulic cylinder is communicated with the servo valve; the servo valve is communicate with the oil line in the lateral-swing shaft; and a cylinder rod of the hydraulic cylinder is hinged to the shank longitudinal-swing assembly through a sliding-block linkage.

6. The 4-degree-of-freedom leg mechanism of claim 5, wherein the sliding-block linkage comprises a sleeve, a sliding block and a push rod; the sleeve is connected to the cylinder body of the hydraulic cylinder; the cylinder rod of the hydraulic cylinder is connected to one end of the sliding block; the sliding block is sleeved in the sleeve; the other end of the sliding block is hinged to one end of the push rod; and the other end of the push rod and the sleeve are hinged with the shank longitudinal-swing assembly, respectively.

7. The 4-degree-of-freedom leg mechanism of claim 1, wherein the shank longitudinal-swing assembly comprises an outer cylinder, an inner rod, a damping spring and a foot end; the inner rod is inserted into the outer cylinder; an upper end of the inner rod is provided with a limit ring; a lower end of the inner rod is fixedly connected to the foot end; the damping spring is arranged between the foot end and the outer cylinder; and the damping spring is sleeved on the inner rod.

8. The 4-degree-of-freedom leg mechanism of claim 7, wherein the foot end comprises an ankle, a fixed part and a positioning foot; the ankle is connected to the inner rod and the fixed part, respectively; the fixed part is provided with a groove for accommodating the positioning foot; and the positioning foot is fixedly connected to the fixed part via a bolt.

9. The 4-degree-of-freedom leg mechanism of claim 8, wherein a six-dimensional force sensor is arranged between the ankle and the inner rod; the positioning foot is a rubber cylinder; and a groove is arranged on a cylindrical surface of the positioning foot contacting with a ground.

* * * * *